(12) United States Patent
Je et al.

(10) Patent No.: US 11,039,905 B2
(45) Date of Patent: Jun. 22, 2021

(54) PROSTHESIS DESIGN METHOD AND SYSTEM BASED ON ARCH LINE

(71) Applicant: DDS Company, Seoul (KR)

(72) Inventors: Jin Ah Je, Seoul (KR); Geon Choi, Seoul (KR); Yu Bin Lee, Anyang-si (KR); Ji Min Kim, Goyang-si (KR); Dong Hyun You, Goyang-si (KR)

(73) Assignee: DDS COMPANY, Seoul (KR)

( * ) Notice: Subject to any disclaimer, the term of this patent is extended or adjusted under 35 U.S.C. 154(b) by 0 days.

(21) Appl. No.: 16/762,086

(22) PCT Filed: Nov. 24, 2017

(86) PCT No.: PCT/KR2017/013565
§ 371 (c)(1),
(2) Date: May 6, 2020

(87) PCT Pub. No.: WO2019/088343
PCT Pub. Date: May 9, 2019

(65) Prior Publication Data
US 2020/0383759 A1    Dec. 10, 2020

(30) Foreign Application Priority Data

Nov. 6, 2017 (KR) .................. 10-2017-0146513
Nov. 21, 2017 (KR) .................. 10-2017-0155317

(51) Int. Cl.
*A61C 13/00* (2006.01)
*G06T 7/00* (2017.01)
*G06T 19/20* (2011.01)

(52) U.S. Cl.
CPC ........ *A61C 13/0004* (2013.01); *G06T 7/0014* (2013.01); *G06T 19/20* (2013.01);
(Continued)

(58) Field of Classification Search
CPC ... A61C 13/0004; G06T 7/0014; G06T 19/20; G06T 2207/30036; G06T 2207/30052; G06T 2219/2004
See application file for complete search history.

(56) References Cited

U.S. PATENT DOCUMENTS

2002/0064748 A1    5/2002  Chishti et al.
2004/0015327 A1*   1/2004  Sachdeva ............... A61C 7/002
                                                    702/167
(Continued)

FOREIGN PATENT DOCUMENTS

KR         101057762 B1   8/2011
KR     1020140105837 A    9/2014
(Continued)

OTHER PUBLICATIONS

International search report of PCT/KR2017/013565, dated Jul. 18, 2018, English translation.
(Continued)

*Primary Examiner* — Brenda C Bernardi
(74) *Attorney, Agent, or Firm* — STIP Law Group, LLC

(57) ABSTRACT

A prosthesis design method according to an embodiment includes loading 3D oral model data from a memory, displaying an oral image and an arch line of the 3D oral model data, providing an alignment interface for aligning the oral image with the arch line, and displaying the oral image aligned with the arch line.

15 Claims, 13 Drawing Sheets

(52) U.S. Cl.
CPC ............... *G06T 2207/30036* (2013.01); *G06T 2207/30052* (2013.01); *G06T 2219/2004* (2013.01)

(56) References Cited

U.S. PATENT DOCUMENTS

| | | | | |
|---|---|---|---|---|
| 2004/0029068 | A1* | 2/2004 | Sachdeva | A61C 9/0046 |
| | | | | 433/24 |
| 2004/0073417 | A1 | 4/2004 | Rubbert et al. | |
| 2004/0197727 | A1* | 10/2004 | Sachdeva | A61C 13/0004 |
| | | | | 433/24 |
| 2005/0048433 | A1* | 3/2005 | Hilliard | A61C 7/00 |
| | | | | 433/24 |
| 2008/0050692 | A1* | 2/2008 | Hilliard | A61C 7/002 |
| | | | | 433/24 |
| 2012/0150494 | A1* | 6/2012 | Anderson | A61C 7/002 |
| | | | | 703/1 |
| 2014/0379356 | A1* | 12/2014 | Sachdeva | A61C 7/002 |
| | | | | 705/2 |
| 2016/0124920 | A1* | 5/2016 | Golay | G06Q 10/10 |
| | | | | 705/3 |
| 2016/0135931 | A1* | 5/2016 | Morales | A61C 13/34 |
| | | | | 433/213 |
| 2019/0151046 | A1* | 5/2019 | Kim | A61C 19/04 |

FOREIGN PATENT DOCUMENTS

| | | | |
|---|---|---|---|
| KR | 1020160048805 | A | 5/2016 |
| KR | 101632373 | B1 | 6/2016 |
| KR | 101641840 | B1 | 7/2016 |
| KR | 20160140326 | A * | 12/2016 |
| KR | 1020160140326 | A | 12/2016 |
| KR | 20170112938 | A * | 10/2017 |
| KR | 1020170112938 | A | 10/2017 |
| KR | 1020170122975 | A | 11/2017 |
| WO | WO2011089470 | A1 | 7/2011 |

OTHER PUBLICATIONS

Office Action from Korean Intellectual Property Office of 10-2017-0146513, dated Feb. 22, 2019, English translation.
Office Action from Korean Intellectual Property Office of 10-2017-0155317, dated Mar. 26, 2019, English translation.

* cited by examiner

[FIG. 1]
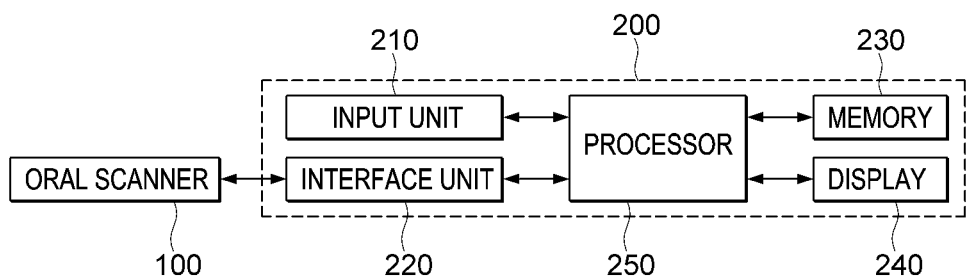
[FIG. 2]
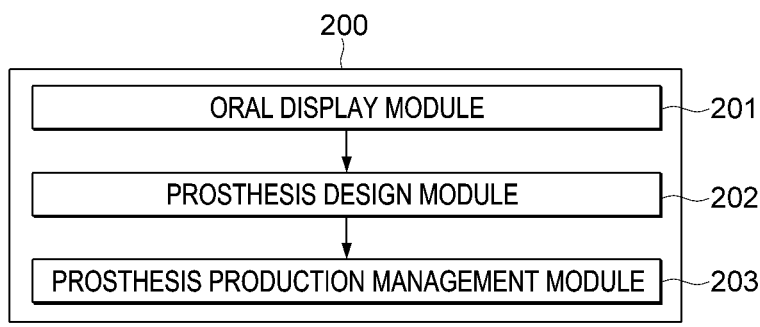
[FIG. 3]
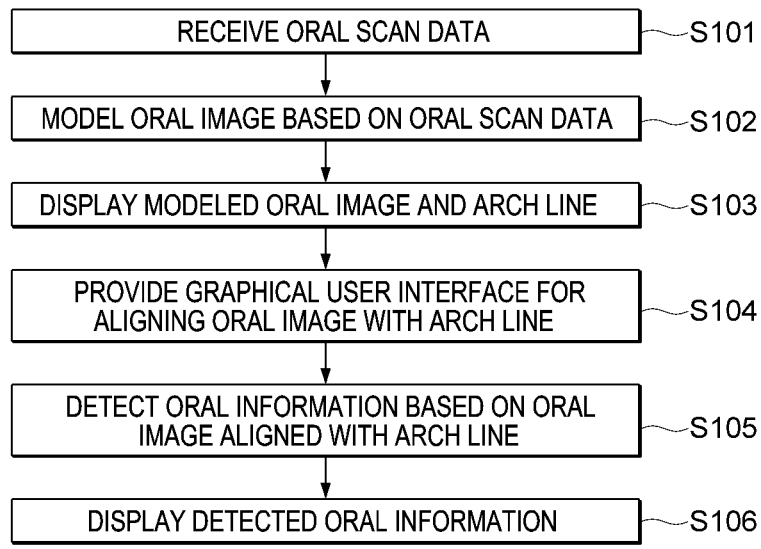

[FIG. 4A]
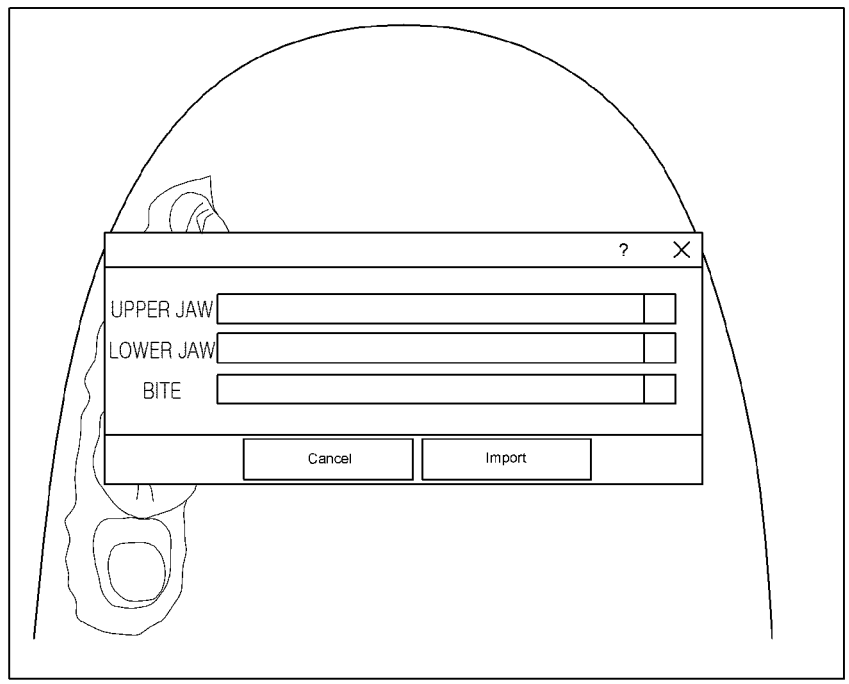
[FIG. 4B]
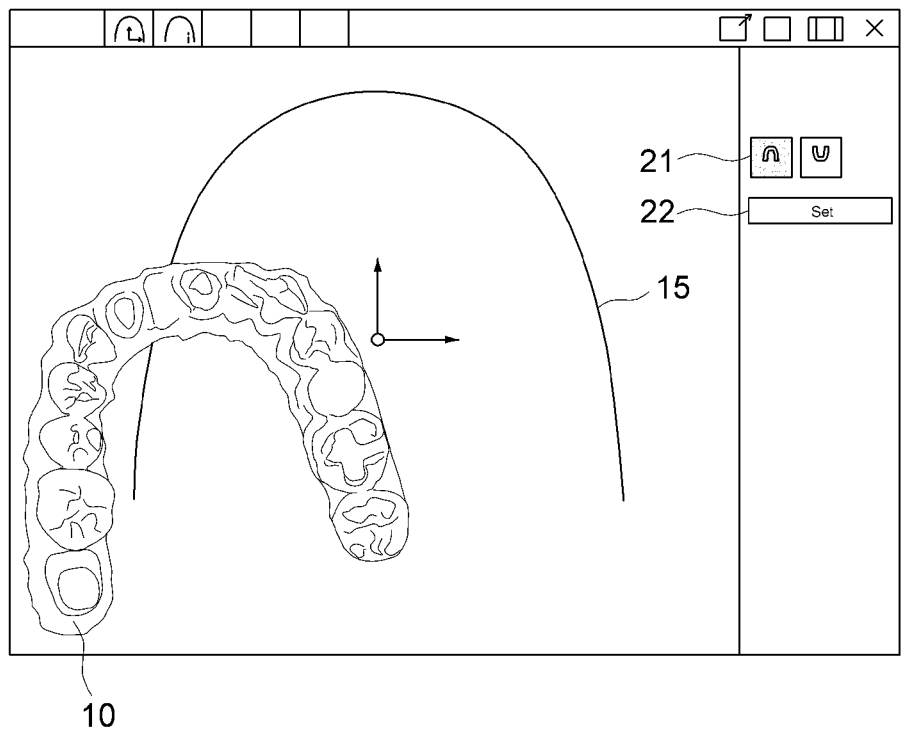

[FIG. 4C]
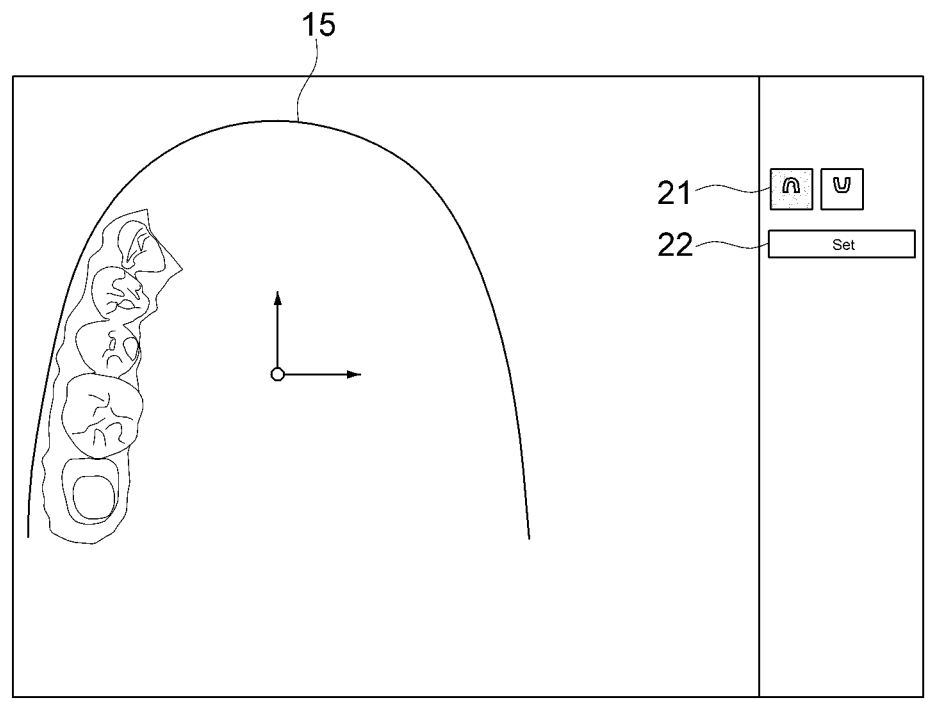
[FIG. 5]
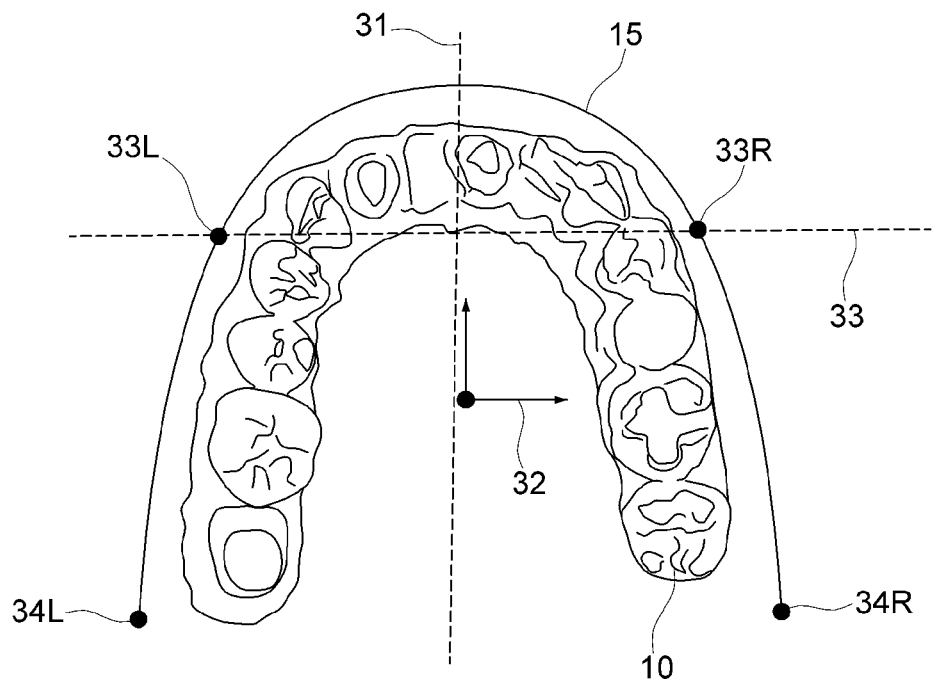

[FIG. 6]
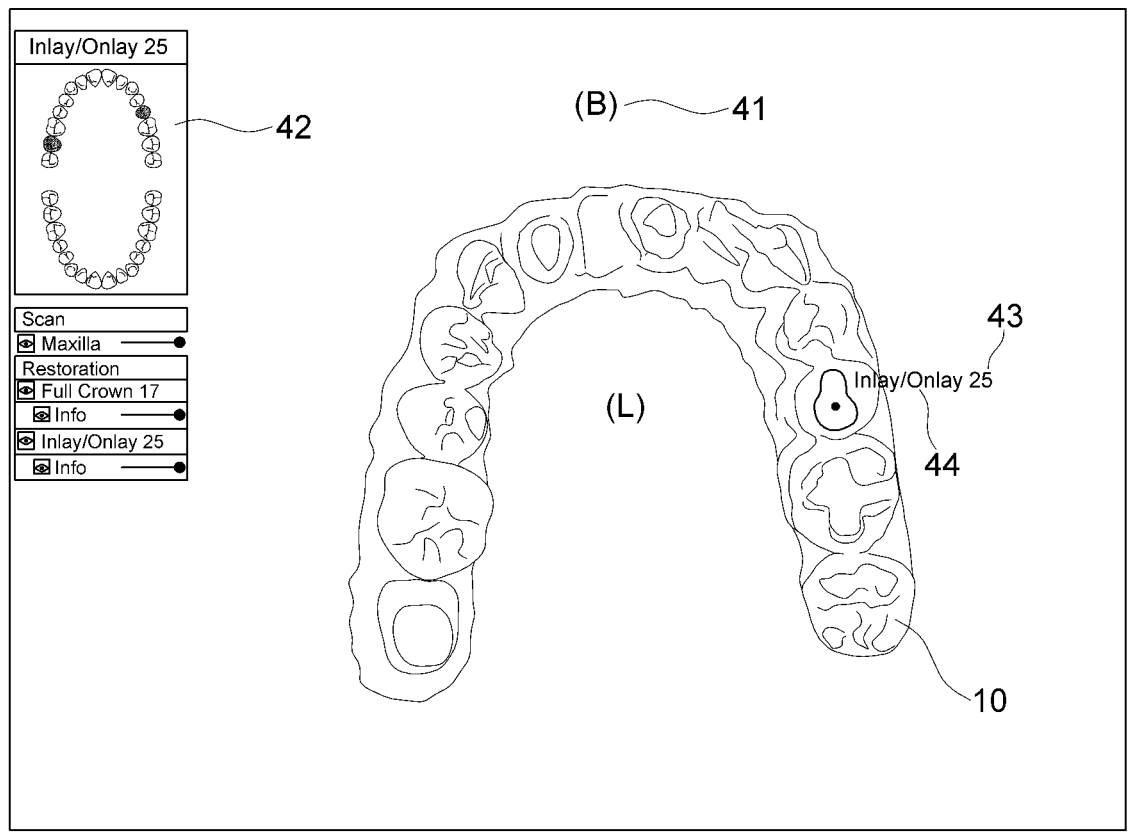
[FIG. 7]
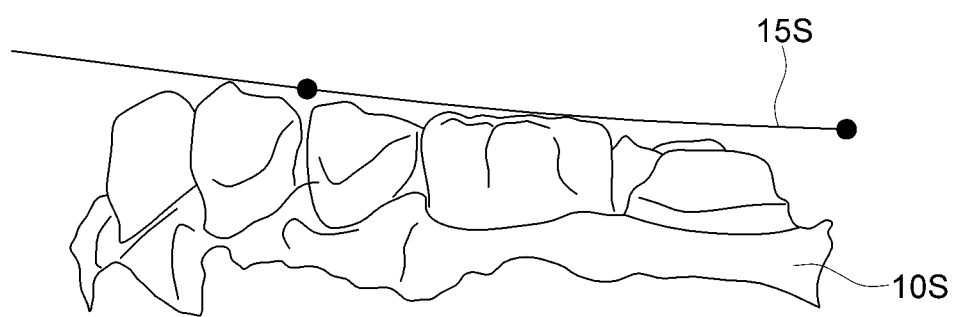

[FIG. 8]
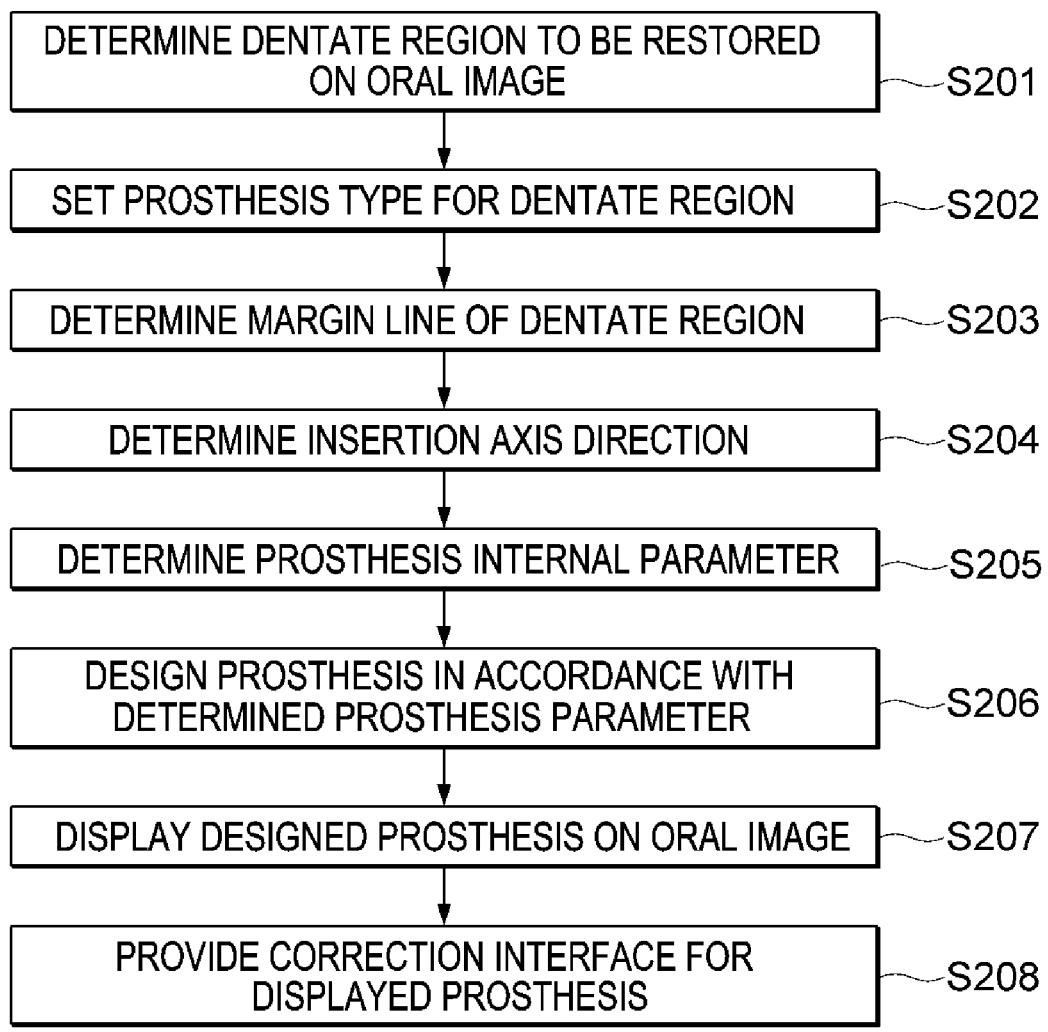

[FIG. 9]
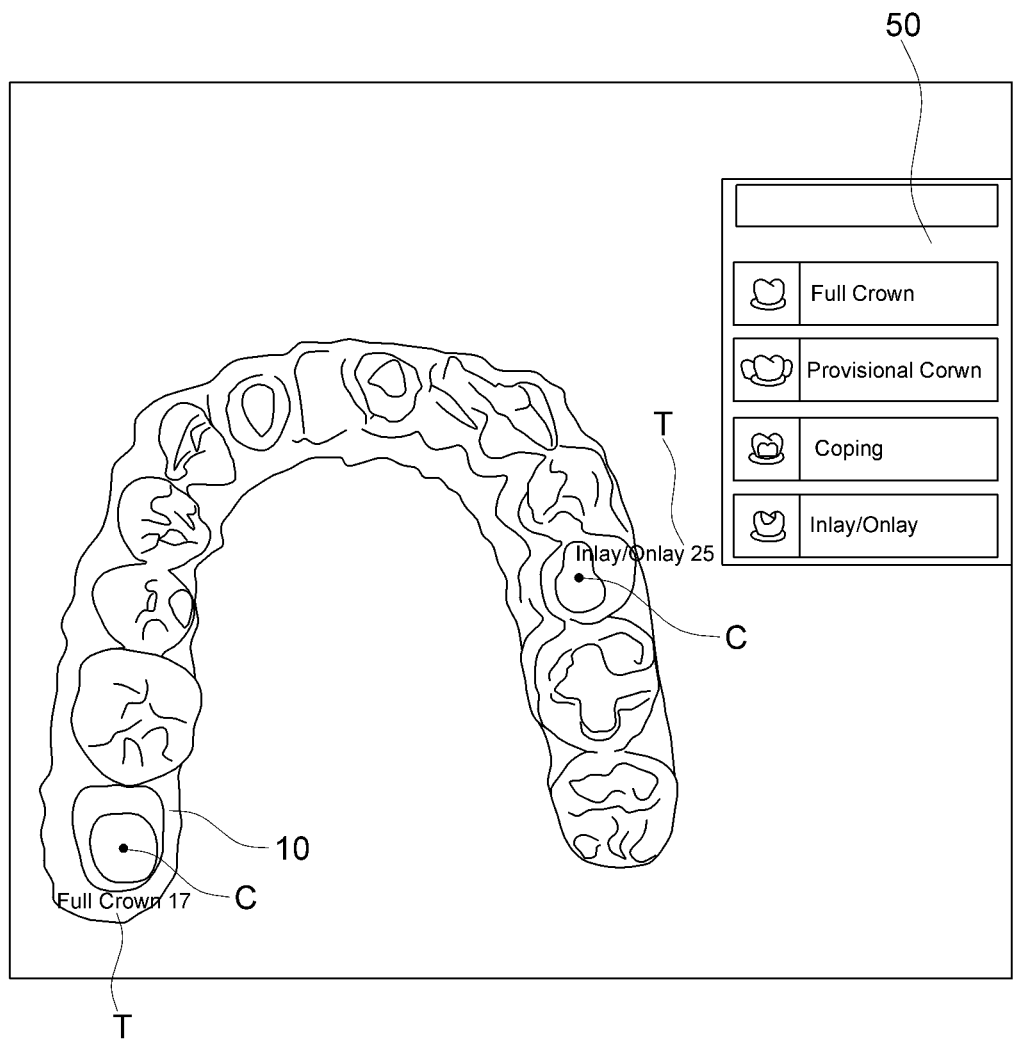

[FIG. 10A]
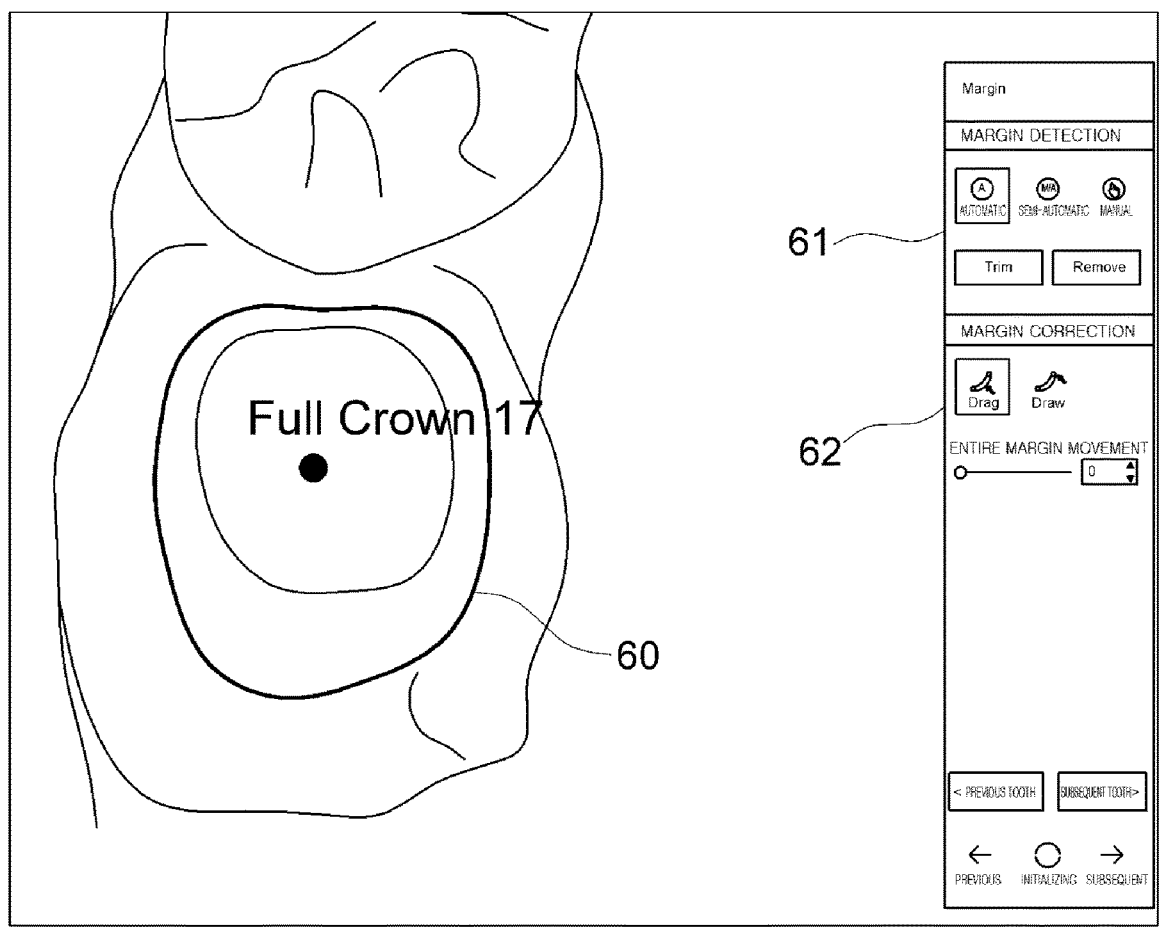

[FIG. 10B]
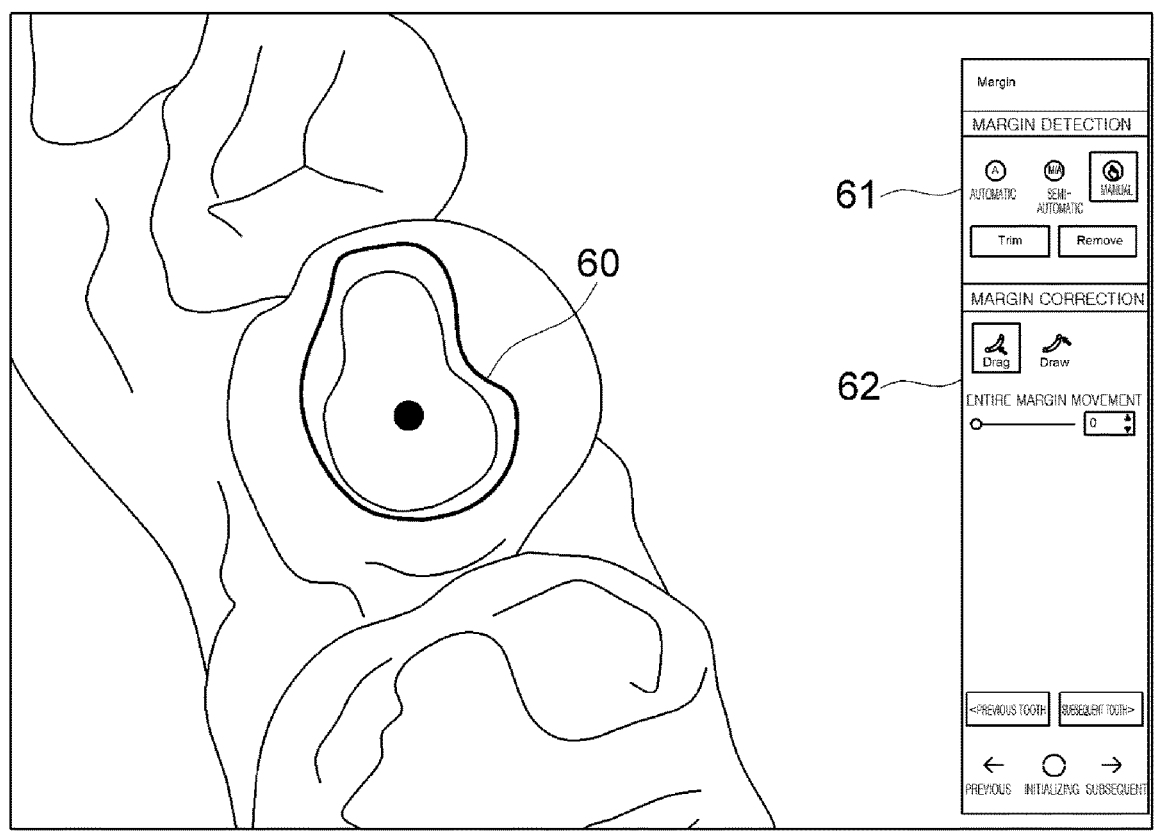

[FIG. 11A]
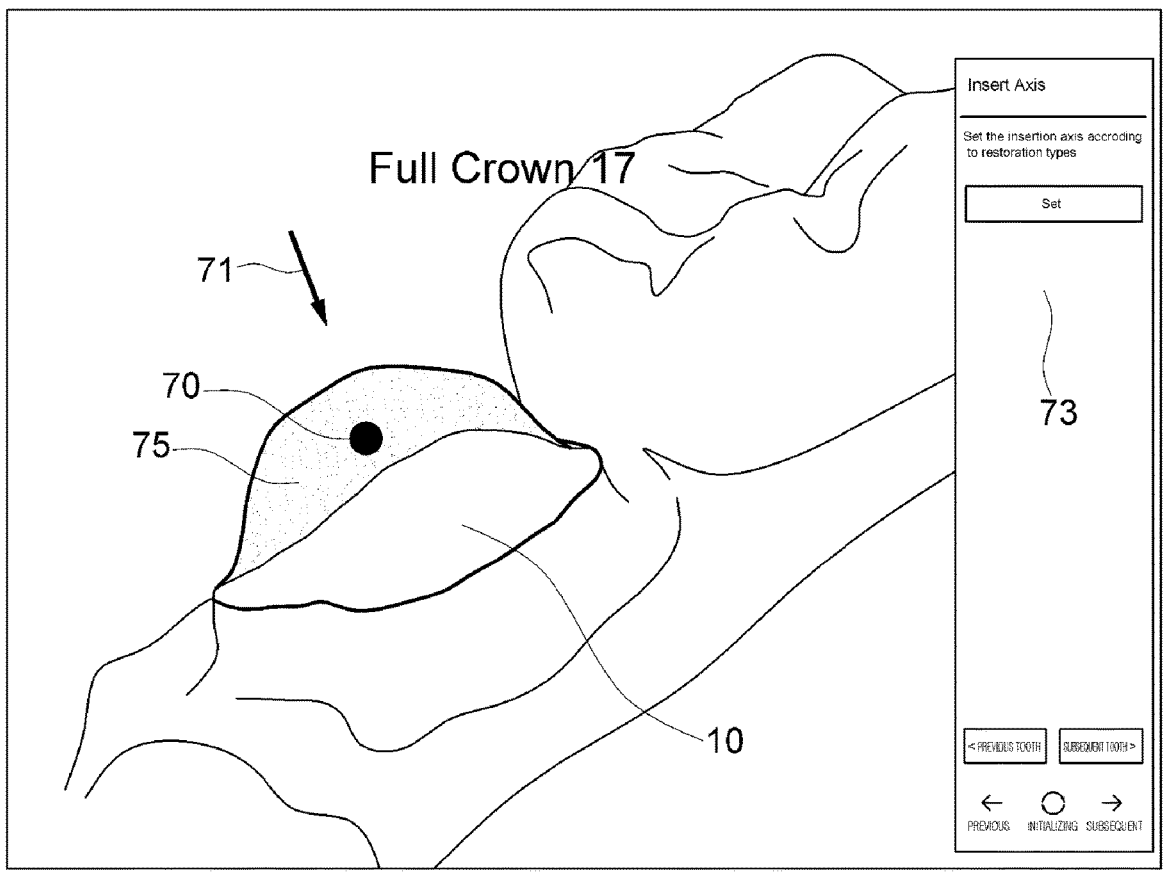

[FIG. 11B]
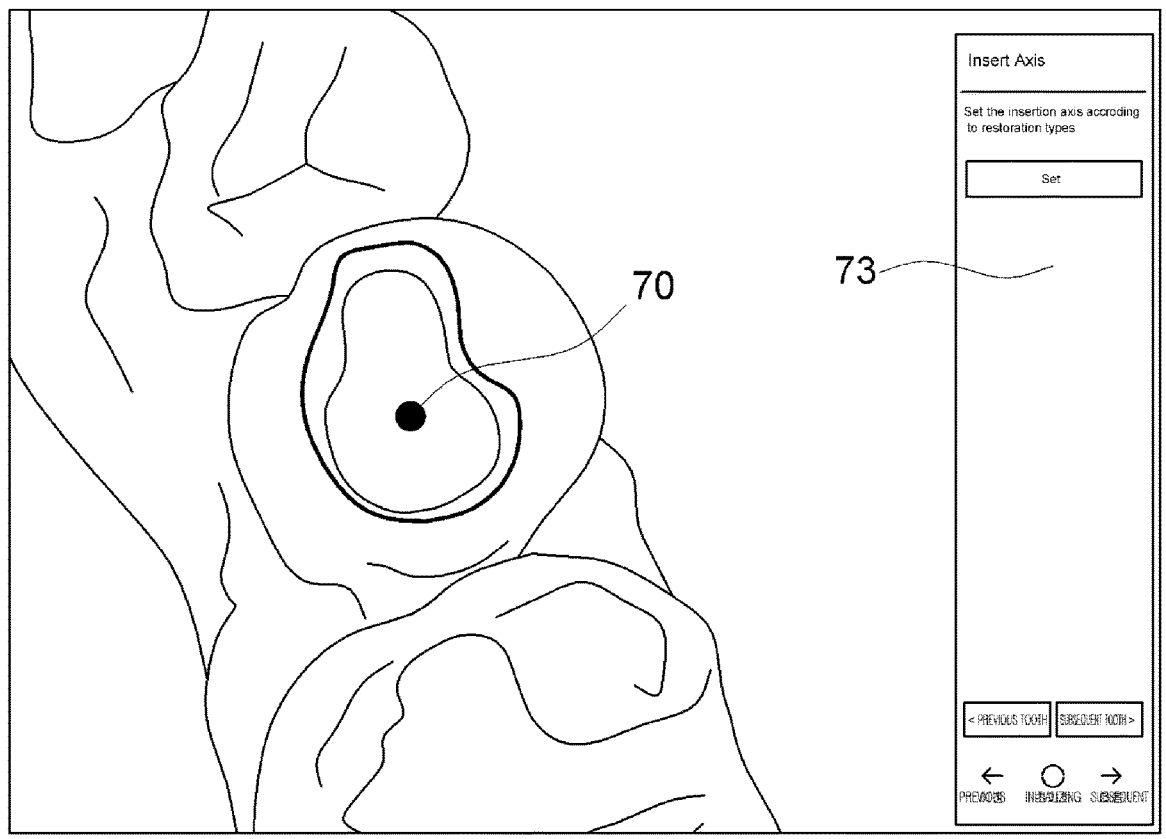

[FIG. 12]
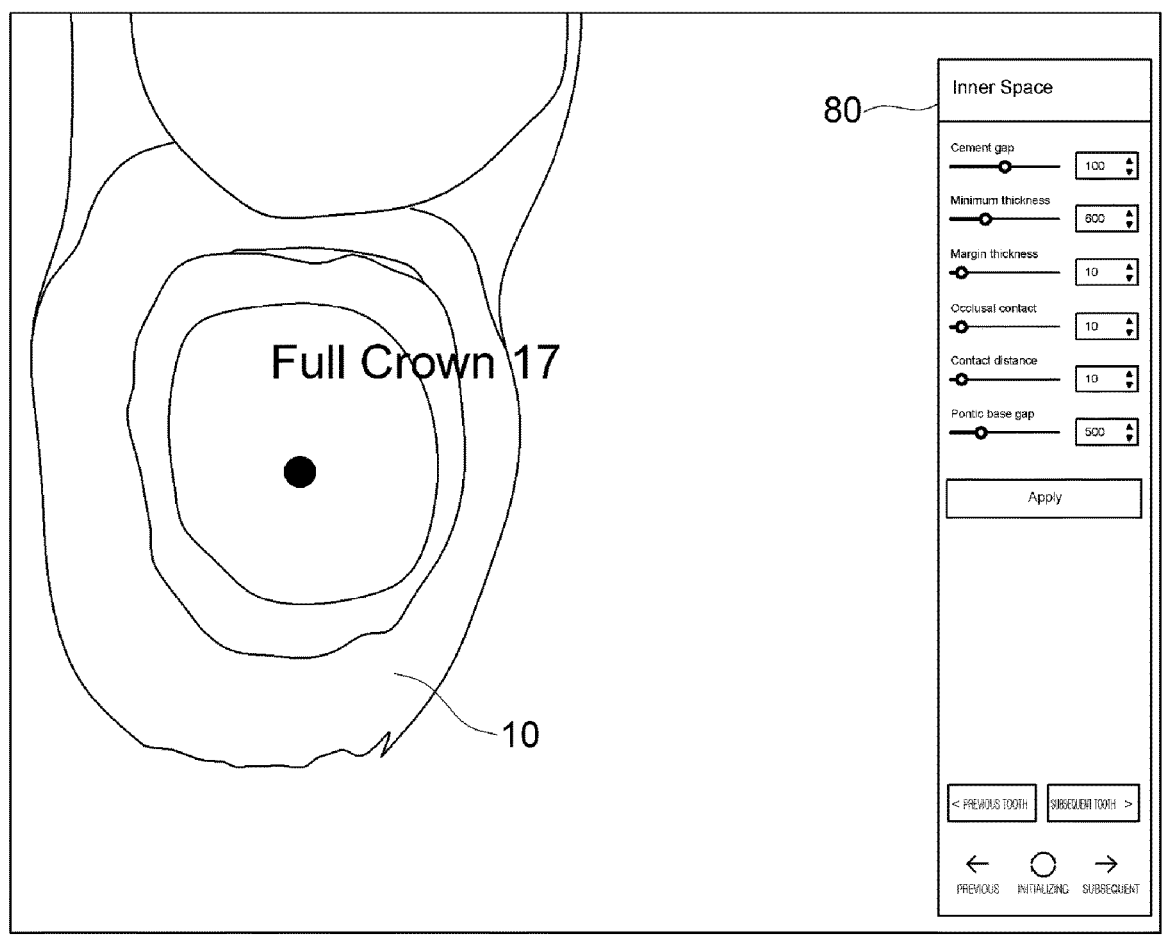

[FIG. 13]
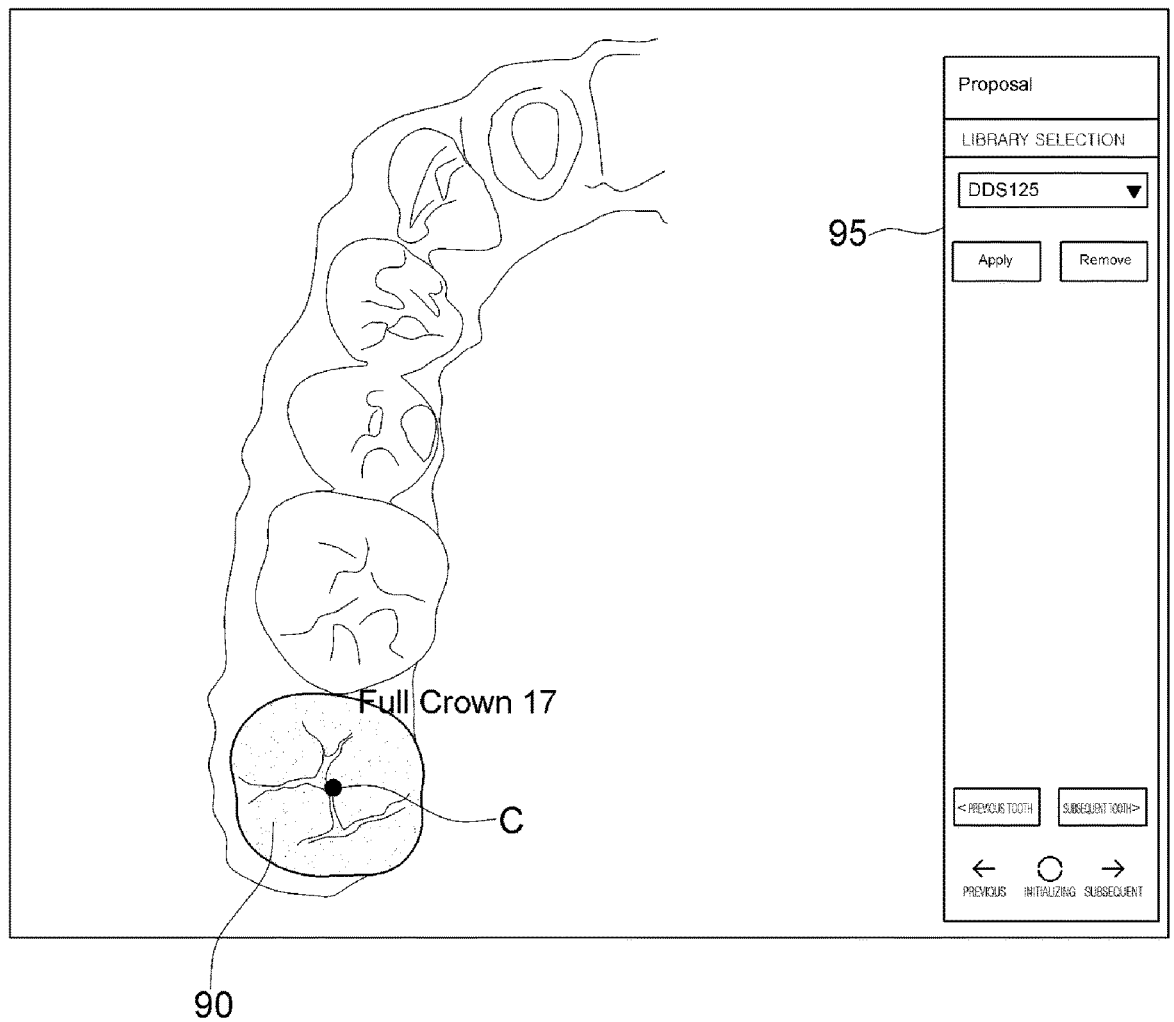

[FIG. 14]
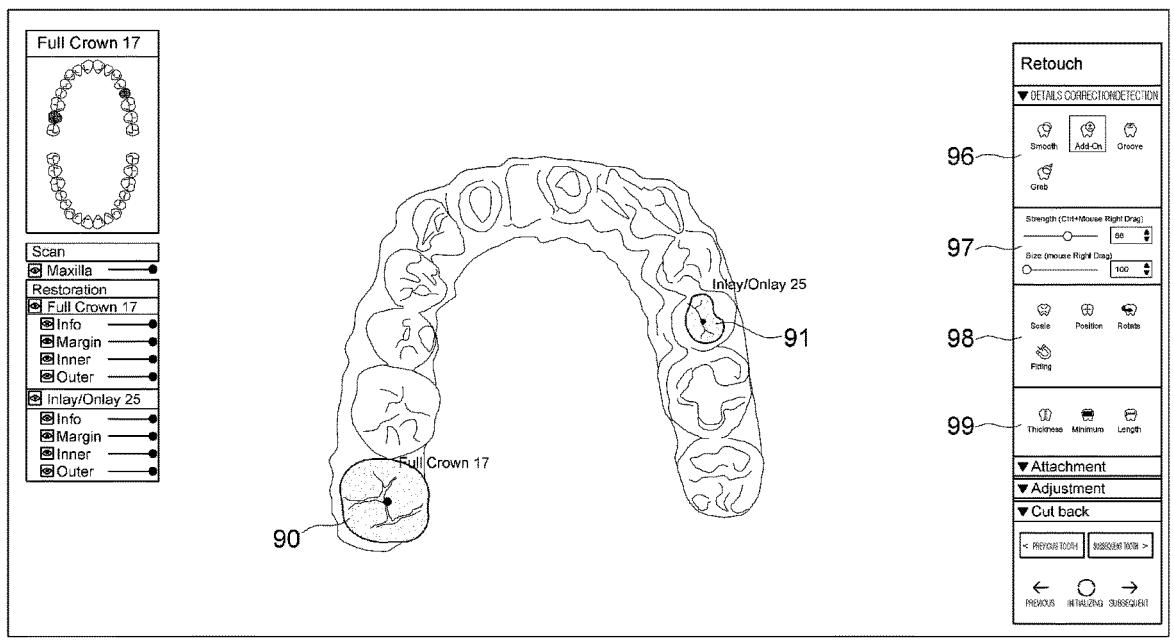

PROSTHESIS DESIGN METHOD AND SYSTEM BASED ON ARCH LINE

CROSS-REFERENCE TO RELATED APPLICATIONS

This application is the U.S. National Phase under 35 U.S.C. § 371 of International Application No. PCT/KR2017/013565 filed on Nov. 24, 2017, which in turn claims the benefit of Korean Application No. 10-2017-0146513 filed on November 6, and 10-2017-0155317 filed on Nov. 21, 2017, the disclosures of which are incorporated by reference into the present application.

BACKGROUND OF THE DISCLOSURE

Field of the Disclosure

The present disclosure relates to a prosthesis design method based on an arch line, and a system including the same.

Related Art

Impression acquisition in a dental prosthesis producing process is an important clinical process which serves as a basis for diagnosing a patient's condition, preparing a future treatment plan, or producing an accurate prosthesis by transferring a state of teeth and tissues in an oral cavity to an impression material.

A general impression acquisition method requires a clinician's skilled clinical technique to select a suitable impression material and to acquire an accurate impression in accordance with a clinical procedure. In an impression acquisition process, repeated impression acquisition may be inevitably due to various factors such as deformation of the impression material which is caused by incorrect selection or incorrect use of the impression material, and a patient's vomiting reaction or trismus irrelevant of the clinician's skill. In addition, even in a step of producing a gypsum model after the impression acquisition, an error may be caused in producing a dental prosthesis due to inherent limitations and abrasion of the impression material in reproducing a minute portion.

Accordingly, computers have been utilized in order to design or process the dental prosthesis which needs manual work, and researches have been progressively carried out in order to automate design and production of the dental prosthesis.

Specifically, a prosthesis production system has been actively developed as follows. The oral cavity is digitally scanned using an oral scanner, and scanned oral cavity data is modeled and displayed in a 3D manner. Thereafter, the dental prosthesis is designed using the computer, and the designed prosthesis is produced, based on the above-described 3D oral cavity model.

In particular, a prosthesis design technology has attracted great attention. According to the prosthesis design technology, an oral image modeled in the prosthesis production system is displayed for a user to easily recognize the oral image, and the displayed oral image is used to easily design the prosthesis which is precise and aesthetically excellent.

Recently, according to the prosthesis design system, the oral image is analyzed through a rapidly developing image analysis tool to provide oral information which is helpful for designing the prosthesis. However, there are many difficulties in analyzing the oral image since there is no reference in analyzing the oral image in a case of analyzing an entire oral image. In particular, in a case of analyzing a partial oral image, there is a disadvantage in that the oral image cannot be substantially analyzed due to missing information relating to an entire oral cavity.

Additionally, the prosthesis design system has the following disadvantages. The prosthesis design system helps a user to design the prosthesis by providing the user with a graphical user interface (GUI) for designing the prosthesis. Most of the graphical user interfaces cause the user to design the prosthesis through a manual drawing. Therefore, quality in designing the prosthesis depends on capability of a worker, thereby causing a disadvantage in that a working time is excessively required.

SUMMARY OF THE DISCLOSURE

The present disclosure provides a prosthesis design method in which various types of oral information required for prosthesis design can be accurately acquired by analyzing an oral image, based on an arch line, and in which a prosthesis can be easily and precisely designed, based on the oral information accurately acquired in this way.

In an aspect, there is provided a prosthesis design method including loading 3D oral model data from a memory, displaying an oral image of the 3D oral model data and an arch line, providing an alignment interface for aligning the oral image with the arch line, and displaying the oral image aligned with the arch line.

In another aspect, there is provided a prosthesis design method including acquiring oral information relating to an oral image aligned with an arch line, determining at least one dentate region to be restored on the oral image, determining a prosthesis type of a virtual prosthesis to be designed in the determined dentate region, determining a margin line of the determined dentate region, determining an insertion axis direction which is a direction in which the virtual prosthesis is inserted into the oral image, designing the virtual prosthesis in accordance with a determined prosthesis design parameter, and locating the designed prosthesis on the oral image and displaying the oral image on which the virtual prosthesis is located.

In still another aspect, there is provided a prosthesis design system serving as a prosthesis design computing device which provides a user with a graphical user interface for designing a prosthesis, based on oral information and an oral image. The prosthesis design system includes an oral cavity display module that provides a function to display the oral information and the oral image, a prosthesis design module that provides a graphical user interface for designing the prosthesis, based on the oral information and the oral image, and a prosthesis production management module that provides a function to design production management data for producing the prosthesis designed through the prosthesis design module.

BRIEF DESCRIPTION OF THE DRAWINGS

FIG. 1 is a block diagram illustrating a physical configuration of a prosthesis design system according to an embodiment of the present disclosure.

FIG. 2 is a block diagram illustrating a functional configuration of the prosthesis design system according to the embodiment of the present disclosure.

FIG. 3 is a flowchart illustrating a process in which the prosthesis design system according to the embodiment of the present disclosure displays oral information.

FIG. 4A illustrates an oral image loading process according to the embodiment of the present disclosure. FIG. 4B illustrates an example of a display screen for a loaded entire oral image according to the embodiment of the present disclosure. FIG. 4C illustrates an example of a display screen for a loaded partial oral image according to the embodiment of the present disclosure.

FIG. 5 illustrates a user interface for aligning an oral image with an arch line according to the embodiment of the present disclosure.

FIG. 6 illustrates an example of a screen for displaying the oral information according to the embodiment of the present disclosure.

FIG. 7 illustrates an example of a screen for displaying an oral image aligned with a side arch line according to the embodiment of the present disclosure.

FIG. 8 is a flowchart illustrating a process of designing a prosthesis, based on the oral information and the oral image according to the embodiment of the present disclosure.

FIG. 9 illustrates a prosthesis parameter setting screen according to the embodiment of the present disclosure.

FIGS. 10A and 10B illustrate a margin line setting screen of a restoring region according to the embodiment of the present disclosure.

FIGS. 11A and 11B illustrate an insertion axis direction setting screen of the prosthesis according to the embodiment of the present disclosure.

FIG. 12 illustrates a prosthesis internal parameter setting screen according to the embodiment of the present disclosure.

FIG. 13 illustrates a 3D oral cavity model in which a virtual prosthesis is synthesized according to the embodiment of the present disclosure.

FIG. 14 illustrates a screen which provides an interface for correcting the virtual prosthesis according to the embodiment of the present disclosure.

DESCRIPTION OF EXEMPLARY EMBODIMENTS

The present disclosure may be modified in various ways, and may adopt various embodiments. Specific embodiments will be illustrated in the drawings, and will be described in detail. Advantageous effects and features of the present disclosure, and methods of achieving the advantageous effects will become apparent with reference to the embodiments described below in detail together with the drawings. However, the present disclosure is not limited by the embodiments disclosed below, and can be embodied in various forms. In the following embodiments, terms such as first and second are not limited meanings, and are used to distinguish one component from other components. In addition, a singular expression includes a plurality of expressions unless the context clearly indicates otherwise. In addition, terms such as include or have mean that a feature or a component described in the specification exists, and does not preclude a possibility that one or more other features or components may be added thereto. In addition, in the drawings, a size of the components may be exaggerated or reduced for convenience of description. For example, a size and a thickness of each component are arbitrarily illustrated in the drawings for convenience of description. Therefore, the present disclosure is not necessarily limited to those which are illustrated.

Hereinafter, the embodiments of the present disclosure will be described in detail with reference to the accompanying drawings. In describing the embodiments with reference to the drawings, the same reference numerals will be assigned to the same or corresponding components, and repeated description thereof will be omitted.

Outline

In a prosthesis design system which provides a prosthesis design method according to the embodiment, a patient's oral cavity is scanned through an oral scanner, and scan data is transmitted. The scan data received by a prosthesis design computing device is used to model the oral cavity in a 3D manner. Thereafter, a modeled 3D oral image is displayed. Based on the modeled 3D oral image, it is possible to provide a prosthesis design graphical user interface (CAD) for designing a prosthesis.

Furthermore, a prosthesis design system can provide a prosthesis production data design interface (CAM) which generates prosthesis production data for producing the prosthesis in a prosthesis production device, based on data relating to the designed prosthesis.

In this case, the prosthesis design system can assist a user to intuitively understand the oral image by displaying the oral image together with the arch line when the oral image is displayed. The oral image aligned with the arch line is analyzed with reference to the arch line. In this manner, it is possible to accurately acquire various types of oral information required for the prosthesis design.

In addition, the prosthesis design system can provide a graphical user interface for easily and precisely designing the prosthesis, based on the acquired oral information.

Specifically, the prosthesis design system provides an interface for designing the prosthesis by sequentially setting parameters of the prosthesis, and provides an interface for setting the parameters in a stepwise manner based on the intuitive oral information. Accordingly, even an unskilled user can easily, precisely, and accurately design the prosthesis, and can design the prosthesis having uniform quality without depending on the user's capability.

In this case, the prosthesis described herein may mean an artificial substitute for one or more teeth or related tissues. For example, when the prosthesis is an implant which serves as a root of the teeth, the prosthesis means any or all of a Fixture inserted into an alveolar bone, an Abutment connected to the fixture, and a Crown which covers an upper portion of the Abutment to form an outer upper portion of an artificial tooth. In addition, types of the prosthesis include Inlay, Onlay, Crown, Laminate, Bridge, Coping, Implant or Denture. In addition, in a broad concept, the prosthesis may also include dental related aids such as surgical guides and orthodontic devices.

Hereinafter, each configuration of the prosthesis design system will be described in detail.

FIG. 1 illustrates an internal block diagram of the prosthesis design system according to the embodiment of the present disclosure.

Referring to FIG. 1, the prosthesis design system according to the embodiment of the present disclosure may include an oral scanner 100 and a prosthesis design computing device 200.

Oral Scanner

First, the oral scanner 100 may scan a patient's oral cavity (for example, a digital impression) to acquire scan data for modeling the patient's oral cavity in a 3D manner.

The oral scanner 100 according to the embodiment serves to transmit the scan data acquired by entirely or partially scanning the oral cavity through triangulation, lasers, images or scanning techniques, to the prosthesis design computing device 200.

Thereafter, the scan data is transmitted to the prosthesis design computing device 200, and then, remaining processes until the prosthesis is designed are performed in the prosthesis design computing device 200. Prior to the description of the prosthesis design method, each configuration of the prosthesis design computing device 200 will be first described in detail.

Physical Configuration of Prosthesis Design Computing Device

Referring back to FIG. 1, the prosthesis design computing device 200 according to the embodiment may include an input unit 210, an interface unit 220, a memory 230, a display 240, and a processor 250.

Specifically, the input unit 210 may detect execution inputs for turning on/off the prosthesis design computing device 200, or settings and execution inputs for various functions relating to the prosthesis design. For example, the input unit 210 may include various buttons disposed in the prosthesis design computing device 200, may include a touch sensor coupled with a display 240, and may include input devices such as a mouse and a keyboard which are connected through the interface unit 220.

In addition, the prosthesis design computing device 200 may include the interface unit 220 for transmitting and receiving data to and from an external device in a wired or wireless manner.

Specifically, the interface unit 220 may serve as a data path to and from various types of external devices connected to the prosthesis design computing device 200. For example, the interface 220 may be connected to the oral scanner 100 to receive the oral cavity scan data or to transmit various scan-related setting inputs, and may be connected to a prosthesis production device to produce the prosthesis by transmitting prosthesis production data. In addition, the interface unit 220 may be connected to various devices (for example, a mouse and a keyboard) of the input unit 210 to receive an input from a user.

The interface unit 220 may include at least one of a wired/wireless headset port, an external charger port, a wired/wireless data port, a card port of the memory 230, a port for connecting devices equipped with an identification module, an audio input/output (I/O) port, a video input/output (I/O) port, and an earphone port. In addition, the interface unit 220 may include a wireless communication module such as Bluetooth and Wi-Fi.

In addition, the prosthesis design computing device 200 may include the memory 230.

The memory 230 may store multiple application programs (application programs or applications) running on the prosthesis design computing device 200, data and commands for operations of the prosthesis design computing device 200.

For example, the memory 230 may include a prosthesis design program (CAD) for designing the prosthesis, and may include prosthesis production management data (CAM) for generating prosthesis production data by receiving data of the designed prosthesis.

As hardware, the memory 230 may be various storage devices such as a ROM, a RAM, an EPROM, a flash drive, and a hard drive, and may further include a web storage having a storage function of the memory 230 on the Internet.

In addition, the prosthesis design computing device 200 may include the display 240 for displaying a graphic image relating to the prosthesis design.

The display 240 may be integrally mounted on a computing device, or may be connected to the computing device through the interface unit 220 as a separate display device.

Finally, the prosthesis design computing device 200 may include the processor 250 that executes application programs by controlling an overall operation of each unit. The processor 250 may be realized by using at least one of application specific integrated circuits (ASICs), digital signal processors (DSPs), digital signal processing devices (DSPDs), programmable logic devices (PLDs), field programmable gate arrays (FPGAs), controllers, micro-controllers, microprocessors, and electrical units for fulfilling other functions.

At least one program for designing the prosthesis is installed in the memory 230 of the prosthesis design computing device 200, and the processor 250 may provide various functions for designing the prosthesis by using the program.

Functional Configuration of Prosthesis Design Computing Device

FIG. 2 illustrates a block diagram of the prosthesis design system according to the embodiment of the present disclosure.

Specifically, referring to FIG. 2, in terms of functionality, the prosthesis design system may include an oral cavity display module 201, a prosthesis design module 202, and a prosthesis production management module 203.

First, the oral cavity display module 201 may provide a function to display the 3D oral model 240 through the oral scanner 100 or through the scan data received from an external device.

Specifically, the oral cavity display module 201 may process the scan data before modeling, may generate the 3D oral model, and thereafter, may display the 3D oral model as the oral image which enables various graphic interfaces.

In addition, the oral cavity display module 201 may convert a 3D oral model file received from an external device into a format workable by the prosthesis design module 202, and may display the oral image which enables various graphic interfaces.

In addition, the oral cavity display module 201 may acquire various types of the oral information by analyzing the oral cavity model and/or the oral image. In this case, the oral cavity display module 201 may align the oral image with the arch line, and may analyze the oral image aligned with the arch line to acquire various types of the accurate oral information.

Subsequently, the oral cavity display module 201 may display the oral information together with the oral image to assist a clinician to more easily understand a patient's oral cavity condition. The oral cavity display module 201 may provide the prosthesis design module 202 with the oral image and the oral information to assist the prosthesis design module 202 to provide the graphical user interface for designing the prosthesis.

The oral cavity display module 201 may be included in the prosthesis design module 202. In the following description, an example will be described in which the prosthesis design module 202 includes the oral cavity display module 201.

The prosthesis design module 202 may be referred to as a Computer Aided Design (CAD), and may construct a database to optimally perform planning, drawing, and correction of the prosthesis design. In this manner, the prosthesis design module 202 may provide a prosthesis design function to quickly and accurately handle all matters of the prosthesis design.

In addition, the prosthesis design module 202 may serve as the oral cavity display module 201 that assists a user to understand data required for the prosthesis design by displaying the data in a form of the oral image and the oral information.

The prosthesis is designed using the computing system in this way. Accordingly, it is possible to improve efficiency by reducing a required time and cost of design work, to improve productivity, and to improve quality and reliability.

That is, the prosthesis design module 202 may display the 3D oral model as the oral image, may display the oral information acquired from the oral image together, and may provide the graphical user interface for designing the prosthesis based on the oral image and the oral information.

Finally, the prosthesis production management module 203 may be referred to as Computer Aided Manufacturing (CAM) in a field of producing the prosthesis, and may be a related technology introduced to a prosthesis producing stage when a final design plan is confirmed after the prosthesis design is completed by the prosthesis design module 202.

Specifically, the prosthesis production management module 203 may provide a prosthesis production management function. Accordingly, a user can use a computer to smoothly perform production management design required for all production processes such as process design (process planning, production method, and ordering), a production technology, processing, and sub design required for the processing.

For example, the prosthesis production management module 203 may form a processing path for processing the prosthesis through a virtual milling program when the production device is a milling device, and may produce the prosthesis by transmitting information on the formed processing path and prosthesis production data to the milling device.

Through the prosthesis design module 202 and the prosthesis production management module 203, the user can carry out all tasks including oral image confirmation, prosthesis design, and prosthesis production management.

Oral Cavity Analysis Method

Hereinafter, referring to FIGS. 3 to 8, a process will be described in detail in which the prosthesis design module 202 acquires the oral information to effectively display the oral information together with the oral image.

FIG. 3 is a flowchart illustrating a process in which the prosthesis design system according to the embodiment of the present disclosure displays the oral information.

Referring to FIG. 3, first, the prosthesis design module 202 may receive data obtained by scanning the oral cavity from the oral scanner 100 (S101).

In another the embodiment, the prosthesis design module 202 may load the scan data obtained by previously scanning the oral cavity from an external server or the memory 230.

Here, the oral cavity scan data may include an image, a laser TOF value, and location information of the oral scanner 100, depending on a type of the scanner. According to the embodiment, the oral cavity scan data may include an image captured through an omnidirectional lens and the location information of the oral scanner 100.

The oral cavity scan data may be the scan data obtained by scanning all of the entire oral cavity including the maxilla, the mandibula, and the occlusal surface, may be the scan data obtained by scanning one of the maxilla, the mandibula, and the occlusal surface, and may be the scan data obtained by scanning a partial region of the maxilla, a partial region of the mandibula, or a partial region of the occlusal surface.

In contrast, in order to assist the user to scan the oral cavity while the oral cavity is scanned, the prosthesis design module 202 may simultaneously display a real-time obtained image, a captured image, a 3D data image for a single model, and a preview image obtained through 3D data synthesis.

When the oral cavity scan data is loaded, the prosthesis design module 202 may acquire 3D oral model data by modeling the oral cavity in a 3D manner based on the oral cavity scan data (S102).

Specifically, the prosthesis design module 202 may acquire the 3D oral model data by modeling the patient's oral cavity in the 3D manner based on the image included in the oral cavity scan data and/or the location information of the oral scanner 100.

In particular, according to the embodiment, the prosthesis design module 202 may generate the 3D oral model by matching partial images obtained by imaging partial regions of the maxilla (or the mandibula), based on the entire image obtained by imaging the entire maxilla (or the mandibula) through the omnidirectional lens. In this manner, it is possible to further improve accuracy of the 3D oral model by minimizing matching errors with the partial images.

In contrast, the prosthesis design module 202 may load the pre-modeled 3D oral model data from a server or the memory 230.

When the 3D oral model data is generated, the prosthesis design module 202 may display the oral image included in the modeled 3D oral model data (S103) In this case, the prosthesis design module 202 may further display the arch line together with the oral image.

Specifically, the prosthesis design module 202 may control the display 240 to display the oral image obtained when viewed from one side of the 3D oral model. In this case, the prosthesis design module 202 may provide an interface for controlling a view point when viewed. Accordingly, the user can confirm the 3D oral model at a view point for viewing the 3D oral model through the input unit 210.

According to the embodiment, the prosthesis design module 202 may display a maxilla oral image, a mandibula oral image, a partial oral image, and a side oral image. Hereinafter, all of the oral images will be defined to mean the maxilla oral image or the mandibula oral image, and the partial oral image will be defined to mean a partial region image of the maxilla or a partial region image of the mandibula.

Together with the oral image, the prosthesis design module 202 may further display an arch line. Here, the arch line means lines having a bow shape, a U-shape, a horseshoe shape, and a semicircle shape which correspond to the oral image.

The arch line may serve to display the entire oral cavity so that the user can intuitively understand a location of the oral image with respect to the entire oral cavity, and may present criteria for locating each region of the oral image in the entire oral cavity. Accordingly, it is possible to acquire various types of more accurate oral information, when the prosthesis design computing device 200 analyzes the oral image aligned with the arch line.

According to the embodiment, the arch line may have a form in which a shape (for example, a curvature or a size) thereof is fixed by default. For example, the arch line may be illustrated to have a pre-stored work size and curvature which are specified in accordance with a size for generally illustrating the modeled oral image.

That is, according to the embodiment, the arch line may not be the arch line that reflects patient's inherent characteristics obtained by analyzing the oral image depending on a shape of the patient's oral cavity, and may be the stored and designed arch line by reflecting a form of the arch line of the oral cavity basically possessed by persons.

In order to further facilitate arch line alignment, the arch line according to another embodiment may have a form corresponding to a shape such as a size and/or a curvature of the displayed oral image.

Specifically, when the entire oral image is displayed, the arch line may have a size corresponding (similar) to a size of the entire oral image.

In addition, the arch line may have a curvature corresponding to a rough curvature of the entire oral image.

For example, the prosthesis design module 202 may generate the arch line in a size proportional to a size of the entire oral image, and may generate the arch line to have a curvature and a curvature change value which correspond to a curvature and a curvature change value of the entire oral image.

In a case where the partial oral image is displayed, the size and the curvature can be determined by guessing the entire oral image of the partial oral image. Specifically, a proportion of the partial oral image to the entire oral image may be determined to calculate the size of the entire oral image, based on the ratio. Thereafter, the size of the arch line to be displayed may be determined in accordance with the calculated size of the entire oral image.

According to another embodiment, the prosthesis design module 202 may determine the size and the curvature of the arch line in accordance with statistical information which previously stores the size and the curvature of statistical arch lines which match ages or body information of patients having the partial oral image.

The prosthesis design module 202 may provide an alignment interface for controlling the size and/or the curvature of the arch line. Therefore, in a case where the arch line displayed on the display 240 does not correspond to the oral image, the user may adjust the size of the oral image, or may manually set the size and the curvature of the arch line so as to correspond to the oral image.

FIG. 4A illustrates an oral image loading process according to the embodiment of the present disclosure. FIG. 4B illustrates an example of a display screen for a loaded entire oral image according to the embodiment of the present disclosure. FIG. 4C illustrates an example of a display screen for a loaded partial oral image according to the embodiment of the present disclosure.

As illustrated in FIG. 4A, the prosthesis design module 202 may load the 3D oral model data previously stored in the memory 230.

When loading is completed, the prosthesis design module 202 may display an oral image 10 and an arch line 15 together. Specifically, referring to FIG. 4B, the prosthesis design module 202 may display the oral image 10 obtained when viewed in a top view in a case of a mandibula oral cavity model, and may display the oral image 10 obtained when viewed in a bottom view in a case of a maxilla oral cavity model. That is, when the prosthesis design module 202 initially displays the oral image 10, the oral image 10 may be displayed in a plan view (top view or bottom view) serving as a view point where the user easily recognize the entire oral cavity model at a time.

In this case, the prosthesis design module 202 may display information 21 relating to whether the oral image 10 displayed on the display 240 is the maxilla or the mandibula, and may provide a setting input interface 22 for correction in a case of wrong display.

Referring to FIG. 4C, the prosthesis design module 202 may display the partial oral image 10 and the arch line 15. In this case, the prosthesis design module 202 may display the information 21 relating to whether the oral image 10 is the maxilla or the mandibula, and may provide the setting input interface 22 for correction in the case of wrong display.

When the partial oral image 10 is displayed, the arch line may be in a form of a full arch. That is, according to the embodiment, the reason is as follows. When the partial oral image 10 is aligned with a position of the full arch with respect to the arch line, it is possible to recognize information (for example, a location, a size, or a region) of the full arch with respect to the partial oral image 10, which is missing information of the partial oral image 10.

The prosthesis design module 202 may provide an alignment interface for aligning the oral image 10 with the arch line 15 by moving the oral image 10 and/or the arch line 15 (S104).

Specifically, the user may correctly align the oral image 10 with the arch line 15 through the alignment interface, in a case where the oral image 10 is not properly aligned with the arch line 15.

For example, the user may move the oral image 10 to an alignment position inside the arch line 15 by dragging the oral image 10. Here, the alignment position means that intervals between respective teeth and the arch line 15 are uniform. In this case, when the size or the curvature of the arch line 15 is a problem, the user may correct the size and the curvature of the arch line 15 to correspond to the oral image 10. According to another embodiment, when an alignment button is pressed after the oral image is located at a rough position inside the arch line, the oral image may be aligned with the arch line by automatically changing the arch line and/or the oral image.

However, according to the embodiment, the arch line may not be the arch line matched with the patient's oral cavity obtained by precisely analyzing the patient's oral image. Accordingly, when the rough position is identified, it is not a problem in analyzing the oral image, based on the arch line. When the intervals between the teeth and the arch line do not exceed a prescribed deviation, it may be determined that the oral image is aligned with the arch line, and the process may proceed to the next step. However, when the intervals exceed the prescribed deviation, a warning message may be output. Therefore, the embodiment may be adopted to induce more precise alignment.

According to the embodiment, the prosthesis design module 202 may display the oral image 10 to be more accurately aligned with the arch line 15. When the oral image 10 enters the arch line (15), the prosthesis design module 202 may display the oral image 10 to additionally overlap the canine tooth line and/or the center line. In this manner, the prosthesis design module 202 may assist the user to align the oral image 10 with the arch line 15 by more accurately recognizing a relationship between the arch line 15 and the oral image 10.

FIG. 5 illustrates a user interface for aligning the oral image 10 with the arch line 15 according to the embodiment of the present disclosure.

Specifically, referring to FIG. 5, the arch line 15 may additionally display at least one of end points 34L and 34R, canine tooth points 33L and 33R, a canine tooth line 33, a center line 31, and a reference direction indicator 32 of the arch line 15. The user may intuitively confirm whether the oral cavity model is accurately aligned with the arch line 15, and may confirm whether the prosthesis design module 202 accurately analyzes the position of the oral cavity model.

According to another embodiment, the prosthesis design module 202 may first provide an automatic alignment function to align the oral image 10 with the arch line 15, and thereafter, may provide an interface for manual correction. That is, the user may automatically align the oral image 10 with the arch line 15 by pressing an automatic alignment button, and thereafter, may align the oral image 10 with the arch line 15 by correcting then curvature and the size of the arch line 15 or the size and the position of the oral image 10.

Conversely, when the user manually moves the oral image 10 to a rough position inside the arch line 15, the prosthesis design module 202 may provide an interface for more easily aligning the oral image 10 with the arch line 15 by automatically readjusting the size and the curvature of the arch line 15 so that the arch line 15 and the oral image 10 do not overlap each other.

When the oral cavity model is aligned with the arch line 15, the prosthesis design module 202 may detect the oral information, based on the oral image 10 aligned with the arch line 15 (S105).

FIG. 6 illustrates an example of a screen for displaying the oral information according to the embodiment of the present disclosure.

Here, referring to FIG. 6, the oral information may include tooth inherent character information relating to the dental structure such as an alignment direction of teeth (for example, a Buccal direction B and a lingual direction L), a tooth number 43, a side arch line 15S, a dental structure, an angle between the teeth, a tooth interval, a tooth size, and may further include tooth condition information such as a tooth color, a dental caries, a decayed tooth, a tooth damage, a tooth loss, and a prosthesis type 44 of a damaged portion.

In a case where the arch line 15 serving as a reference for analyzing the oral image 10 is present to accurately acquire the oral information, the oral image 10 can be more quickly and accurately analyzed.

For example, the prosthesis design module 202 may determine the tooth alignment directions B and L, based on a direction perpendicular to inclination of the arch line 15 corresponding to the teeth. The tooth alignment direction may be effectively used to determine a direction of the prosthesis when the prosthesis is designed and the prosthesis is produced later.

In particular, even in a case where the partial oral image 10 shows a segmented model of the oral cavity, the prosthesis design module 202 may acquire the tooth direction and the tooth number 43 with reference to the arch line 15. That is, even in a case of the oral cavity model including only a partial region of the oral cavity, the prosthesis design module 202 may acquire various types of the oral information relating to the oral cavity mode, and may effectively utilize the oral information when the prosthesis is designed later.

In addition, the prosthesis design module 202 may statistically determine the side arch line 15S with reference to the size and the curvature of the arch line 15. Specifically, the size and the curvature of the arch line 15 and additionally the side arch line 15S (for example, the occlusal surface) matched with the characteristics may be stored in the memory 230. The prosthesis design module 202 may detect the side arch line 15S matched with the arch line 15 having the oral image 10 aligned therewith.

FIG. 7 is an example of a screen for displaying the oral image 10 aligned with the side arch line 15S according to the embodiment of the present disclosure.

Referring to FIG. 7, the side arch line 15S may be additionally displayed on a side oral image 10S which is a side view of the 3D oral model. The side arch line 15S may be a base in setting a shape of a facing surface of the prosthesis to be designed later. For example, the inclination of the facing surface of the prosthesis may correspond to the inclination of the side arch line 15S.

In addition, the prosthesis design module 202 may more easily detect the tooth number 43, the tooth size, the dental caries, the decayed tooth, the tooth loss, and the tooth damage with reference to the arch line 15. The oral information may be used to automatically set parameters of the prosthesis to be designed.

In addition, the prosthesis design module 202 may segment the oral image 10 for each tooth, based on the acquired oral information, and may display the segmented oral image 10 of the teeth required for the prosthesis design.

In this way, the prosthesis design module 202 may display the oral image 10 with reference to the arch line 15, may assist the user to intuitively recognize the oral cavity condition, may acquire various types of accurate oral information by analyzing the oral image 10 with reference to the arch line 15, and may more easily and quickly design by assisting the user to design the prosthesis, based on the oral information.

Prosthesis Design Method

Hereinafter, a method for easily and precisely designing the prosthesis in accordance with sequential steps based on the oral information and the oral image acquired in this way will be described with reference to FIGS. 8 to 14.

The prosthesis design module 202 according to the embodiment may provide the prosthesis design interface for designing the prosthesis in accordance with the sequential steps based on the oral image displaying the 3D oral cavity model and the oral information obtained by analyzing the oral cavity model with reference to the arch line. Specifically, the prosthesis design interface allows the user to sequentially determine the parameters for designing the prosthesis in each step by providing the oral information suitable for each step, and may allow the user to synthesize and correct the oral image trough the determined parameters and the oral information. Accordingly, the user can effectively and easily design the prosthesis.

Here, the prosthesis design parameter may include at least one of the dentate region to be restored, the prosthesis type, the margin line, the insertion axis, the prosthesis internal parameters (for example, a minimum thickness, a margin thickness, a cement gap, a contact distance, a pontic base gap), the prosthesis size, the tooth alignment direction, the side arch line, the tooth number of the prosthesis to be restored.

The prosthesis design parameter may be manually set in accordance with the prosthesis design interface by the user, or may be automatically set in accordance with the oral information acquired by analyzing the oral image, based on the arch line.

First, referring to FIG. 8, the prosthesis design module 202 may determine the dentate region to be restored on the oral image which displays the 3D the oral cavity model (S201).

According to the embodiment, the prosthesis design module 202 may determine a partial region of the oral image as the dentate region, based on a user input for the displayed oral image. For example, the user may input a specific spot, a specific region, or a specific tooth on the oral image so as to select the dentate region to be restored.

Specifically, referring to FIG. 9, the prosthesis design module 202 may display the oral image, and when a specific spot c is selected on the oral image by the user, the prosthesis design module 202 may select the selected specific spot c and a region around the specific spot c, as the dentate region to be restored.

According to the embodiment, the dentate region may be a region for designing one prosthesis. Specifically, the dentate region is a region for designing the prosthesis for one tooth. When one point is selected by the user, one prosthesis is designed for a damaged tooth at the selected point. Therefore, the prosthesis design module 202 may extract a tooth number T of the damaged tooth from the oral cavity information, and may provide the tooth number T to design the prosthesis matched with the tooth number.

In addition, the specific spot c in the dentate region selected by the user may be a center point in which the designed virtual prosthesis is located later. Therefore, in order to minimize location correction of the prosthesis, it is preferable that the specific spot c is located at the center of the dentate region to be restored. The prosthesis design module 202 may calculate the center of the dentate region to be restored. When the prosthesis design module 202 determines that a distance between the specific spot c and the calculated center exceeds a predetermined distance, the prosthesis design module 202 may provide an interface for issuing an alarm to reset the specific spot c.

In addition, the prosthesis design module 202 may more accurately determine the dentate region which needs restoration, based on the analyzed oral information. Specifically, the prosthesis design module 202 may detect the damaged tooth on the oral image. When the user's designated input is received inside a region occupied by the damaged tooth, the prosthesis design module 202 may determine the region occupied by the damaged tooth, as the dentate region.

According to another embodiment, the prosthesis design module 202 may determine the region of the damaged tooth, as the dentate region to be restored after automatically detecting the damaged tooth on the displayed oral image. In this case, the prosthesis design module 202 may calculate the center point of the determined dentate region, and may locate the virtual prosthesis designed later at the calculated center point.

When the dentate region to be restored is selected, the prosthesis design module 202 may determine the prosthesis type to be designed in the dentate region (S202).

Here, the prosthesis type may include Inlay, Onlay, Crown, Laminate, Bridge, Coping, Implant, or Denture. In addition, in a broad concept, the prosthesis may also include dental related aids such as surgical guides or orthodontic devices.

Specifically, the prosthesis design module 202 may provide the user with an interface for selecting one type by listing types of the prosthesis to be designed in the dentate region. For example, as illustrated in FIG. 9, when the user double-clicks the specific spot c in the dentate region to be restored, prosthesis types 50 to be restored around the dentate region may be listed, and the user may determine the prosthesis type by selecting one type.

In this case, the prosthesis design module 202 may receive the user's setting input for a plurality of the dentate regions, and may provide the user so that a plurality of the prostheses can be designed at a time. In this manner, it is possible to shorten a time required for designing the prosthesis.

For example, as illustrated in FIG. 9, two dentate regions may be selected at the same time, and thereafter, steps for setting the prosthesis design parameters may be performed together. In this manner, two prostheses may be designed at the same time through one sequential process of designing the prostheses.

In summary, the user may designate a first point on the oral image by determining the dentate region to be stored, and may display the tooth number of the determined dentate region. The user may select the prosthesis type of the dentate region. In a case where there are more dentate regions to be restored, the above-described process may be repeatedly performed again to completely set the prosthesis design parameters in a first step.

According to another embodiment, the prosthesis design module 202 may analyze a degree of the tooth damage in the dentate region, and may determine the prosthesis type to be automatically designed depending on the degree of the tooth damage.

When the prosthesis type is set, the prosthesis design module 202 may determine the margin line of the dentate region to be restored (S203).

Specifically, the prosthesis design module 202 may determine the margin line which is a boundary between the prosthesis and the tooth (or a boundary between the prosthesis and the gum) in the dentate region.

In order to determine the margin line, the prosthesis design module 202 may provide an interface for manually, semi-automatically, or automatically designing the margin line.

First, when the user selects an automatic mode, the prosthesis design module 202 may detect a color difference between the gums or the gum regions on the oral image of the dentate region, a damaged tooth, a tooth root, and an adjacent tooth, and may display the determined margin line on the oral image, based on a detection result. In addition, the prosthesis design module 202 may provide a correction interface for manually correcting the automatically determined the margin line.

For example, referring to FIG. 10A, the prosthesis design module 202 may display a margin line 60 automatically calculated in the dentate region, and may provide a correction interface 62 for correcting the margin line 60 with the user's drag input, a correction interface 62 for correcting the margin line 60 with the user's draw input, and a correction interface for moving the entire margin line 60 upward and downward or rightward and leftward.

In addition, when the manual mode is selected, the prosthesis design module 202 may provide an interface for directly drawing the margin line 60 on the oral image with the user's drag input, and may provide an interface for drawing the margin line 60 with the user's draw input.

When the margin line 60 is determined, the prosthesis design module 202 may determine an insertion axis which shows an insertion direction of the prosthesis (S204).

According to the embodiment, the prosthesis design module 202 may provide an interface for setting the insertion axis as a view point in viewing the oral image.

Specifically, the prosthesis design module 202 may control the user to display the oral image by changing the view point for viewing the 3D oral cavity model. When the user selects the changed view point in the insertion axis direction after changing the view point in a step of determining the insertion axis direction, the prosthesis design module 202 may set the view point in the insertion axis direction.

In this case, the prosthesis design module 202 may display a direction of the view point and a block out region which is a region blocking the prosthesis when the prosthesis is inserted from the view point, on the oral image, and may induce the user to correctly select the view point in the insertion axis direction.

For example, referring to FIG. 11A, the view point for viewing the oral image 10 may be displayed as an arrow 71 on the oral image 10. When the prosthesis is inserted in the direction of the arrow 71, a block out region 75 may be displayed in a different color, and the user may be induced to intuitively select the correct insertion axis direction.

In addition, referring to FIG. 11B, when the direction for viewing the oral image is a top view or a bottom view, the arrow 71 indicating the view point may be omitted. When there is no block out region at the view point, the block out region is not displayed. Accordingly, the user may easily set the view point in the insertion axis direction by pressing a set button 73.

When the insertion axis direction is set, the prosthesis design module 202 may determine the prosthesis parameter (S205).

Specifically, according to the embodiment, the prosthesis design module 202 may determine a prosthesis internal parameter which is not determined out of the prosthesis design parameters, and the parameter relating to an outer shape of the prosthesis.

Here, the prosthesis internal parameter may include at least one of the minimum thickness, the margin thickness, the cement gap, the contact distance, and the pontic base gap of the prosthesis.

The prosthesis internal parameter may be basically set to a value that is generally and statistically used in dentistry. Therefore, a step of setting the prosthesis internal parameter according to the embodiment may be a step of confirming the basis setting or the user's setting value once again and correcting the basis setting or the user's setting value.

For example, referring to FIG. 12, in the step of setting the prosthesis internal parameter, prosthesis internal parameters 80 may be listed, the setting value for each parameter may be displayed, and an interface for changing the setting values may be provided.

When the prosthesis design parameter is set in this way, the prosthesis design module 202 may design the virtual prosthesis in accordance with the determined prosthesis parameter (S206).

Specifically, the prosthesis design module 202 may detect a prosthesis shape matched with the set prosthesis design parameter from a library.

For example, the prosthesis design module 202 may detect the prosthesis shape matched with the tooth number and the prosthesis type from a library 95.

The prosthesis design module 202 may change the detected prosthesis shape in accordance with the prosthesis design parameter or the oral information.

For example, the prosthesis design module 202 may change the detected prosthesis shape in accordance with the margin line 60 and the prosthesis internal parameter.

In addition, the prosthesis design module 202 may change an upper surface of the detected prosthesis shape to be inclined along the side arch line.

When the virtual prosthesis is designed, the prosthesis design module 202 may display the designed virtual prosthesis to overlap the oral image (S207).

Specifically, the prosthesis design module 202 may display the virtual prosthesis designed based on the prosthesis design parameter and/or the oral information by locating the virtual prosthesis on the oral image.

For example, the prosthesis design module 202 may locate the virtual prosthesis so that the specific spot c (for example, a center point) of the dentate region is the center of the virtual prosthesis. In this case, a direction of locating the virtual prosthesis may be determined in accordance with the axis direction and the tooth alignment directions B and L.

Referring to FIG. 13, the prosthesis design module 202 may locate the virtual prosthesis so that the center of the virtual prosthesis 90 is the specific spot c of the dentate region, and may cause the direction of locating the virtual prosthesis 90 (for example, horizontal and vertical rotation directions) to match the insertion axis direction and the tooth alignment directions of the dentate region.

When the virtual prosthesis 90 is displayed on the oral image, the prosthesis design module 202 may provide an interface for manually correcting the virtual prosthesis 90 (S208).

Specifically, the prosthesis design module 202 may provide the correction interface for viewing the virtual prosthesis 90 synthesized and displayed on the oral image, and correcting the virtual prosthesis 90 while confirming the virtual prosthesis 90 which is corrected on a real time basis.

Here, as illustrated in FIG. 14, the parameters for correcting the virtual prosthesis 90 may include an outer shape parameter 96 such as groove, smooth, add-on, and grab of the virtual prosthesis 90, a parameter 97 for the strength and the thickness of the virtual prosthesis 90, a location parameter 98 for the scale, the position, and the rotation of the virtual prosthesis 90, and the prosthesis internal parameters 99.

When these parameters are corrected, the user may confirm that the virtual prosthesis 90 displayed on the oral image is changed on the real time basis, and may easily and intuitively correct the design of the virtual prosthesis 90.

In this way, the prosthesis design module 202 may provide the prosthesis design interface in which the prosthesis having uniform quality can be easily designed irrelevant of the user's skill by sequentially setting the prosthesis design parameters in a stepwise manner.

In addition, the prosthesis design module 202 may induce the user to more accurately and quickly set the prosthesis parameters by effectively providing the oral information acquired with reference to the arch line, when the prosthesis design parameters are set in the stepwise manner.

In addition, the prosthesis design module 202 may provide the interface for effectively confirming whether the design of the virtual prosthesis 90 is accurate by locating the designed virtual prosthesis 90 at the accurate position on the oral image, and may provide the correction interface for correcting the prosthesis design which can be intuitively corrected while the user views the virtual prosthesis 90.

The embodiment according to the present disclosure described above may be implemented in a form of program commands that may be executed through various computer components, and may be recorded in a computer-readable recording medium. The computer-readable recording medium may include program commands, data files, and data structures alone or in combination. The program commands recorded on the computer-readable recording medium may be particularly designed and configured for the present disclosure, or may be known and available to those skilled in the computer software field. Examples of the computer-readable recording medium include a magnetic medium such as a hard disk, a floppy disk, and a magnetic tape, an optical recording medium such as a CD-ROM and a DVD, a magneto-optical medium such as a floptical disk, and a hardware device specifically configured to store and execute the program commands, such as a ROM, a RAM, and a flash memory 230. Examples of the program commands include not only a machine language code produced by a compiler, but also a high-level language code that can be executed by a computer using an interpreter. The hardware device may be changed to one or more software modules to perform the processes according to the present disclosure, and vice versa.

The specific processes described in the present disclosure are examples, and do not limit the scope of the present disclosure in any way. In order to briefly configure the embodiment, electronic configurations in the related art, control systems, software, and other functional aspects of the systems may be omitted in the description. In addition, connections or connection members of the lines between the components illustrated in the drawings are illustrative examples of functional connections and/or physical or circuit connections. In an actual device, all are replaceable, or may be represented by various additional functional connections, physical connections, or circuit connections. In addition, unless specifically described as "essential" or "importantly", the connections or the connections members may not be components which are essential for the application of the present disclosure.

In addition, in describing the exemplary embodiments according to the present disclosure, the present disclosure has been described with reference to preferred embodiments of the present disclosure. However, those skilled in the art or those having ordinary knowledge in the art will understand that the present disclosure may be modified and changed in various ways within the scope not departing from the concept and the technical range of the appended claims to be described later. Therefore, the technical scope of the present disclosure is not limited to contents described in the exemplary embodiments, and is determined by the appended claims.

The present disclosure is industrially applicable as a technology relating to designing the prosthesis based on the oral scanner required for modernized dental treatment and the 3D oral model generated based on the oral cavity scan.

The prosthesis design method according to the embodiment can assist the user to intuitively understand the oral image by displaying the oral image together with the arch line when the oral image is displayed. The oral image aligned with the arch line is analyzed with reference to the arch line. In this manner, it is possible to accurately acquire various types of oral information required for the prosthesis design.

In addition, the prosthesis design method according to the embodiment provides the graphical user interface for the prosthesis design using the oral information. Therefore, a user can more easily and quickly design the prosthesis.

Specifically, according to the prosthesis design method in the embodiment, it is possible to provide the prosthesis design method in which the prosthesis having uniform quality can be easily designed irrelevant of the user's skill by sequentially setting the prosthesis design parameters in a stepwise manner.

In addition, the prosthesis design method according to the embodiment can effectively induce the user to more accurately and quickly set the prosthesis parameters by effectively providing the oral information acquired with reference to the arch line, when the prosthesis design parameters are set in the stepwise manner.

In addition, the prosthesis design method according to the embodiment provides an interface for effectively confirming whether the design of the virtual prosthesis is correct by locating the designed virtual prosthesis at a correct position on the oral image. The prosthesis design method can provide the prosthesis design correction interface which can correct the design of the prosthesis in an intuitive way while the user views the virtual prosthesis displayed in this way.

What is claimed is:

1. A prosthesis design method using a prosthesis design system, the prosthesis design system including an oral scanner scanning a patient's oral cavity and a prosthesis design computing device designing a virtual prosthesis based on oral scan data provided from the oral scanner, comprising:
   acquiring 3D oral model data based on an image including the oral scan data;
   displaying an oral image of the 3D oral model data together with an arch line outside an oral image;
   aligning the oral image with the arch line and then displaying the oral image aligned with the arch line;
   acquiring oral information by analyzing the oral image aligned with the arch line with reference to the arch line and an alignment relationship of the oral image;
   determining at least one dentate region to be restored on the oral image;
   determining a prosthesis type of a virtual prosthesis to be designed in the determined dentate region;
   determining a margin line of the determined dentate region;
   determining an insertion axis direction which is a direction in which the virtual prosthesis is inserted into the oral image;
   designing the virtual prosthesis in accordance with a determined prosthesis design parameter;
   displaying the designed virtual prosthesis to overlap the dentate region of the oral image;
   locating the designed virtual prosthesis on the oral image and displaying the oral image on which the virtual prosthesis is located; and
   providing an interface for manually correcting the virtual prosthesis.

2. The method of claim 1, wherein the arch line is displayed to have a shape corresponding to a shape of the oral image.

3. The method of claim 1, wherein the arch line further displays at least one of a line end point, a canine tooth point, a canine tooth line, a center line, and a reference direction indicator.

4. The method of claim 1, wherein aligning the oral image with the arch line further includes providing a user with an alignment interface, and the alignment interface includes at least one operation of size adjustment of the arch line, curvature adjustment of the arch line, size adjustment of the oral image, and location movement of the oral image.

5. The method of claim 4, wherein providing the user with the alignment interface includes a manual input of the user to move at least a portion of the oral image into the arch line.

6. The method of claim 4, wherein providing the user with the alignment interface further includes displaying the oral image so that the canine tooth line overlaps the arch line or the center line overlaps the oral image, when at least a portion of the oral image moves into the arch line.

7. The method of claim 1,
   wherein the oral information includes at least one of an alignment direction of teeth included in the oral image, a tooth number, a side arch line, a dental structure, an angle between the teeth, a tooth interval, a tooth size, a tooth color, a dental caries, a decayed tooth, a tooth damage, and a tooth loss.

8. The method of claim 7,
   wherein acquiring the oral information by analyzing the oral image with reference to the arch line includes determining the alignment direction of the teeth with reference to a direction perpendicular to inclination of the arch line corresponding to the teeth.

9. The method of claim 7,
wherein acquiring the oral information by analyzing the oral image with reference to the arch line includes detecting the alignment direction or the tooth number of the teeth by analyzing a partial oral image aligned with the arch line with reference to the arch line, in a case where the oral image is the partial oral image which is a partial region of the oral cavity.

10. The method of claim 1, wherein determining the margin line of the determined dentate region includes detecting the margin line by automatically analyzing the oral image of the dentate region, displaying the detected margin line on the oral image, and providing a correction interface for correcting the displayed margin line.

11. The method of claim 1, wherein determining the insertion axis direction further includes causing the oral image to display a block out region which is a region blocking the virtual prosthesis when the virtual prosthesis is inserted in a direction of the view point or from the view point.

12. The method of claim 1, the determined prosthesis design parameter includes at least one of a minimum thickness, a margin thickness, a cement gap, a contact distance, and a pontic base gap of the virtual prosthesis.

13. The method of claim 1, wherein designing the virtual prosthesis includes detecting a prosthesis shape matched with the tooth number and the prosthesis type from a library.

14. The method of claim 1, wherein designing the virtual prosthesis further includes changing the detected prosthesis shape in accordance with the prosthesis design parameter or the oral information.

15. The stepwise method of claim 1, wherein changing the detected prosthesis shape further includes changing an upper surface of the virtual prosthesis to be inclined along the side arch line of the oral information.

* * * * *